(12) United States Patent
Spanbauer et al.

(10) Patent No.: US 8,234,154 B2
(45) Date of Patent: Jul. 31, 2012

(54) SYSTEM AND METHOD FOR PHARMACEUTICAL GEOGRAPHIC MARKET SEGMENTATION

(75) Inventors: Jeff Spanbauer, Cincinnati, OH (US); Scott Weintraub, Flemington, NJ (US)

(73) Assignee: Healthcare Regional Marketing LLC, Cincinnati, OH (US)

( * ) Notice: Subject to any disclaimer, the term of this patent is extended or adjusted under 35 U.S.C. 154(b) by 1074 days.

(21) Appl. No.: 12/117,132

(22) Filed: May 8, 2008

(65) Prior Publication Data

US 2009/0281868 A1      Nov. 12, 2009

(51) Int. Cl.
*G06Q 30/00* (2012.01)
(52) U.S. Cl. ...................................... 705/7.34; 705/7.38
(58) Field of Classification Search ................. 705/7.33, 705/7.34
See application file for complete search history.

(56) References Cited

U.S. PATENT DOCUMENTS

| | | | | |
|---|---|---|---|---|
| 7,729,931 | B1 * | 6/2010 | Tobin | 705/7.34 |
| 7,953,626 | B2 * | 5/2011 | Wright et al. | 705/7.39 |
| 2004/0260599 | A1 * | 12/2004 | Ziegele et al. | 705/10 |
| 2005/0154635 | A1 * | 7/2005 | Wright et al. | 705/11 |
| 2006/0161471 | A1 * | 7/2006 | Hulen et al. | 705/10 |
| 2006/0190318 | A1 * | 8/2006 | Downey et al. | 705/10 |

OTHER PUBLICATIONS

Cutting Edge Information, "Pharmaceutical Market Segmentation: Spending, Strategy, and Implementation" (2006).*
Yankelovich, D. et al., "Rediscovering Market Segmentation," Harvard Business School Publishing Corp. (2008) pp. 1-3.

* cited by examiner

*Primary Examiner* — Neil Kardos
(74) *Attorney, Agent, or Firm* — Frost Brown Todd LLC

(57) ABSTRACT

Techniques for pharmaceutical market segmentation can include measuring the influence of a plurality of predictors on market share for a pharmaceutical product, assigning districts to a plurality of incidence classes for the pharmaceutical product, and assigning districts to a plurality of segments based on the influence measurements and the incidence class assignments.

13 Claims, 9 Drawing Sheets

Key Segments: Sample Definitions

| Segment | Definition |
|---|---|
| Population Opportunity | High Prevalence in the market with multiple risk factors for disease state |
| Specialist Focus | High Number of Specialists, Large Volume Markets and Good Formulary Coverage |
| Sales Force Access | Poor Call Plan Performance Among Top Quintile HCPs and Good Formulary Coverage |
| Open Market | High Branded Share and Good Formulary Coverage |
| Managed Care Education | Poor Formulary Coverage and/or Significant Pull-Through Opportunity for Product |

Figure 4a

Sample Strategy and Tactical Plan By Segment

| Segment | Strategy | Programs |
|---|---|---|
| Population Opportunity | Improve diagnosis and treatment | ▲ Tactic 1<br>▲ Tactic 2<br>▲ Tactic 3 |
| Specialist Focus | Sell Clinical Benefits and Latest Science to Specialists | ▲ Tactic 4<br>▲ Tactic 5<br>▲ Tactic 6 |
| Sales Force Access | Provide Reps MD Access Tools | ▲ Tactic 7<br>▲ Tactic 8<br>▲ Tactic 9 |
| Open Market | Compare and Differentiate | ▲ Tactic 10<br>▲ Tactic 11<br>▲ Tactic 12 |
| Managed Care Education | Minimize Co-pay Disadvantage | ▲ Tactic 13<br>▲ Tactic 14<br>▲ Tactic 15 |

Figure 4b

SYSTEM AND METHOD FOR PHARMACEUTICAL GEOGRAPHIC MARKET SEGMENTATION

FIELD OF THE INVENTION

Aspects of the inventors' technology can be implemented to provide pharmaceutical market segmentation.

BACKGROUND

Pharmaceutical products are often marketed nationwide in hundreds of individual sales territories referred to as "districts." Prior to the development of the techniques disclosed herein, the pharmaceuticals were generally marketed using a "one size fits all" type nationwide strategy, based on the difficulty of determining individual marketing strategies for each districts. To the extent that pharmaceutical marketing has attempted to take into account variability between districts, it has generally done so based either primarily or exclusively on the formulary position in particular districts. This is not a desirable state of affairs because there are a variety of factors beyond simple formulary position which can affect a pharmaceutical product's performance in particular districts. One technique which has been used to address similar problems of market variability in other fields is segmentation analysis. However, it is widely believed that meaningful analysis of pharmaceutical products is not possible without actively probing the thought processes of individual consumers because of the high level of significance attached to pharmaceutical product selection. See, e.g., Daniel Yankelovich and David Meer, "Rediscovering Market Segmentation," Harvard Business Review, Feb. 2006, 123-131. Accordingly, there is a substantial need for techniques for providing pharmaceutical market segmentation at the geographic level which do not suffer from the shortcomings of the prior art.

SUMMARY

Aspects of this disclosure can be implemented in a variety of manners useful to pharmaceutical market segmentation. For example, certain aspects of this disclosure could be used to implement a computer readable medium having stored thereon a set of instruction operable to configure a computer to perform a set of steps. Such a set of steps might comprise applying an analytic technique to a plurality of measurements for a plurality of districts; for each of a plurality of predictors (one of which may be a demographic predictor), assigning each district from said plurality of districts an incidence class; and, organizing the plurality of districts into three to five segments. In some implementations, three to five segments can be used to obtain a balance between variability in the data and the ability to execute in the market. In a computer readable medium having stored thereon a set of instructions operable to configure a computer to perform an analytic technique, the analytic technique might provide a measurement of influence on performance of a pharmaceutical product. Such a computer readable medium might have instructions operable to configure a computer to perform the above steps even if the plurality of districts comprises at least two hundred districts, or if the plurality of predictors comprises at least 40 predictors. Also, in some implementations, the computer readable medium might have instructions operable to configure a computer to perform the above steps in a case where the predictors comprise at least one predictor taken from each of the classes of payer, provider, prescriber, population, product and place.

Of course, the above discussion should not be understood as being an exhaustive recitation of potential implementations of various aspects of this disclosure. As an example of an alternative implementation, some aspects of this disclosure could be used to implement a computer readable medium having stored thereon a set of instructions operable to configure a computer to provide a segmentation output. Such a segmentation output might comprise a map representing a geographic area divided into a plurality of segments; a plurality of segment definitions, with each segment definition being associated with a single segment from the plurality of segments; and a plurality of strategies, with each strategy associated with a single segment from the plurality of segments. In some cases, the plurality of segments might be visually identified on the map and/or noncontiguous. In some cases, the plurality of segments might consist of between three and five segments. Also, in some cases a set of instructions stored on a computer readable medium might be further configured to display the map on a display device, detect selection of a segment from the plurality of segments on the map and, in response to detecting the selection, displaying a set of additional information associated with the selected segment on the display device. Also, in some implementations, the segmentation output might comprise a plurality of lists of sales force tools, and each list from the plurality of lists might correspond to a segment from the plurality of segments.

Of course, it should be understood that this disclosure is not limited to being implemented in the form of computer readable media. As an example of an alternate implementation, some aspects of this disclosure could be used to implement a method comprising: obtaining a plurality of measurements of the incidence of a plurality of predictors for a plurality of districts; determining a measurement of influence on performance for each of the plurality of predictors; assigning each district from the plurality of districts to a plurality of incidence classes for the plurality of predictors; organizing the plurality of districts into no more than 10 segments based on the measurements of influence and incidence class assignments; and, presenting a pharmaceutical marketing strategy for each segment from the plurality of segments. Other implementations, including systems, machines, methods, and articles of manufacture could also be created based on the disclosure set forth herein. Accordingly, the disclosure above should be understood to be illustrative only, and not limiting.

BRIEF DESCRIPTION OF THE DRAWINGS

FIGS. 4a-4c depict certain aspects of potential output for pharmaceutical market segmentation.

DETAILED DESCRIPTION

Figure 1:
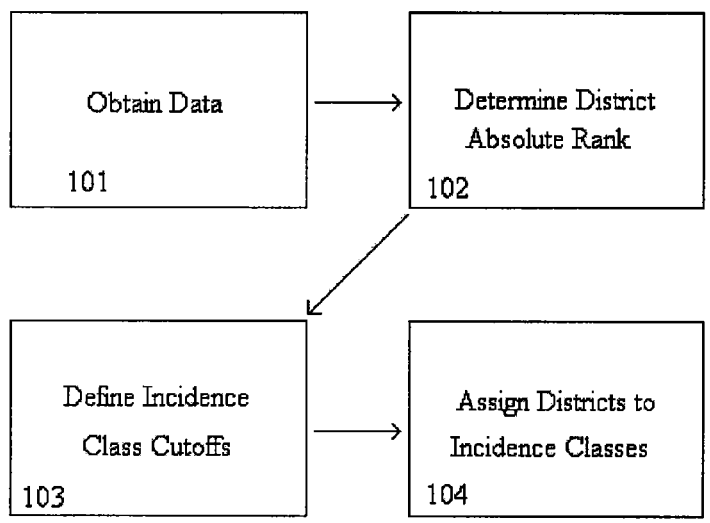
FIG. 1 depicts a sequence which could take place in pharmaceutical market segmentation.

Described herein are techniques which can be used for pharmaceutical market segmentation. While the techniques for pharmaceutical market segmentation are described in detail in terms of specific implementations this disclosure is not intended to indicate limits on the potential implementations contemplated by the inventors. Instead, the inventors' invention should be understood to extend to the full scope of the terms of the claims included in this application, or any related application when given their ordinary meaning as shown by a general purpose dictionary and any special definitions set forth herein, as well as any equivalents thereof. Accordingly, this disclosure should be understood as being illustrative only, and not limiting.

For the purpose of clarity, certain terms used in this application should be understood to have particular meanings. Specifically:

A "computer" should be understood to refer to a device or group of devices which is capable of performing one or more logical and/or physical operations on data to produce a result.

A "computer readable medium" should be understood to include any object, substance, or combination of objects or substances, capable of storing data or instructions in a form in which they can be retrieved and/or processed by a device.

A computer readable medium should not be limited to any particular type or organization, and should be understood to include distributed and decentralized systems however they are physically or logically disposed, as well as storage objects of systems which are located in a defined and/or circumscribed physical and/or logical space.

"Performance" of a pharmaceutical product should be understood to refer to an indication of success of a pharmaceutical product. Exemplary indications of success include brand share (percentage of prescriptions for the product versus prescriptions for its competitors), total sales, sales growth, share growth, and other indications known to those of skill in the art.

A "predictor" should be understood to refer to a measurable characteristic of a district.

As an aid to illustrating a potential implementation for pharmaceutical market segmentation, consider Table 1, which shows rankings and incidence class assignments in terms of predictors for brand share for a plurality of districts.

nal systems (e.g., frequency of marketing contacts with top and/or all MDs in a district, formulary access for a product, etc.), in which case obtaining the data could involve executing queries against the company's existing computer systems (e.g., select statements using the SQL query language). In other cases, data (e.g., total population, population growth, age/ethnicity breakdowns, income levels, etc.) could be obtained from publicly available sources (e.g., census data), from specially commissioned population surveys, or from information stored in a database which might be maintained by a provider of market segmentation analysis. In other cases, data might be obtained by providing questionnaires to knowledgeable personnel within a pharmaceutical company (e.g., asking questions about the payer landscape, the top health plans in an area, or the characteristics about a district's hospitals, etc.). Other techniques such as qualitative interviews are also possible. The above disclosure is intended to illustrate potential techniques which could be used in obtaining data, and is not intended to indicate limits on the potential techniques for data collection which might be used in various implementations of this disclosure. For example, in some cases, one or more of the techniques described above might be used in combination, or other techniques entirely might be used. Accordingly, the above discussion of techniques for obtaining data should be understood as being illustrative only, and not limiting.

Returning to FIG. 1, in the sequence illustrated in that figure, the step of obtaining data [101] is followed by a step of determining an absolute rank for the districts under study [102]. This step can be preformed by examining the prevalence of the individual predictors as indicated by the data, and then placing the districts in ascending order according to their prevalence for the predictor. As an example, for the predictor of "prevalence" if 5% of the population in a first district had the condition addressed by a pharmaceutical product, 10% of the population in a second district had the condition addressed by the pharmaceutical product, and 7% of the population in a third district had the condition addressed by

TABLE 1

Sample rankings and incidence class assignments for various districts in terms of predictors of brand share.

| Region Name | District Name | Population Risk Factors | Prevalence | Adherence | Rx/ Specialist | Specialist Count |
|---|---|---|---|---|---|---|
| Washington DC | Washington DC | M-75 | H-6 | L-132 | L-169 | H-6 |
| New York NY | Manhattan S NY | L-159 | H-3 | M-108 | L-154 | H-18 |
| New Jersey | Newark NJ | H-2 | H-54 | M-83 | L-142 | M-53 |
| Albany NY | Albany NY | L-174 | H-37 | H-28 | H-37 | M-97 |
| Kansas City MO | Omaha NE | M-111 | M-114 | H-40 | M-69 | L-160 |
| Albany NY | Poughkeepsie NY | L-140 | H-61 | M-80 | M-71 | M-84 |
| Boston MA | Providence RI | L-163 | H-41 | L-120 | M-76 | M-59 |
| New Jersey | Parsippany NJ | M-124 | H-16 | M-97 | M-101 | M-44 |

A table such as shown above can be created by following an algorithm such as depicted in FIG. 1. In the algorithm of FIG. 1, the first step depicted is to obtain data [101] which indicates the prevalence of certain predictors of pharmaceutical brand share. This step can be performed using a variety of techniques. For example, in many cases, data regarding various predictors may be kept in a pharmaceutical company's interthe pharmaceutical product, then the second district would be given rank 1, the third district would be given rank 2, and the first district would be given rank 3. This process could then be repeated for each of the predictors, so that eventually each district would have a ranking for each of the predictors measured by the data. Of course, it should be understood that not all predictors would necessarily be ranked in all implementations. For example, in some cases, only a subset of predictors (e.g., predictors known or suspected to have a correlation with success, predictors chosen by management or the sales team of a pharmaceutical company, etc) would be ranked, or only some predictors would be ranked for some districts, while other predictors would be ranked for other districts (e.g., based on variations in available data or other factors). Thus, the ranking described above should be understood as illustrative only, and not limiting on the scope of potential implementations contemplated by the inventors.

Continuing with the discussion of FIG. 1, that figure depicts the step of defining incidence class cutoffs [103] following determining district absolute ranks [102]. For the sake of clarity, defining incidence class cutoffs [103] should be understood to refer to defining the boundaries of groupings which are used to reflect the prevalence of particular characteristics. This step can be accomplished in a variety of manners. For example, in some implementations, incidence class cutoffs might be determined by percentile placements for the various districts (e.g., splitting districts into deciles, quintiles, quartiles, or some other portion). As an alternative, the distribution of the underlying data for a particular factor might be used in defining incidence class cutoffs [103]. For example, if the data indicates that the districts are clustered around three distinct values, then the boundaries of those clusters can be used to define incidence classes of "high," "medium," and "low." Other data-centric methods for determining incidence class cutoffs [103] include placing boundaries in breaks in the data, and placing boundaries at inflection points in a polynomial best fit curve for a histogram of the data, as well as iterative methods, such as trying to define the incidence classes which best "fit" the data (e.g., as shown by measure such as variance of data within and between classes) while still ensuring that the classes have certain characteristics (e.g., maintaining classes having between 50 and 100 members given a total population of 200 districts). Of course, it should be understood that combinations of the above techniques (e.g., initially trying a best-fit graphical method, then switching to using deciles as incidence classes if the incidence classes determined by the graphical method do not meaningfully categorize the data), as well as other techniques entirely could also be utilized. Similarly, in various implementations, the same or different techniques could be used for different factors. Accordingly, the above discussion of determining incidence class cutoffs [103] should be understood to be illustrative only, and not limiting.

In FIG. 1, after determining incidence class cutoffs [103], the method depicted in that figure proceeds to assign districts to incidence classes [104]. This step can be accomplished, for example, by using a computer program which loops through the different districts and, for each district, uses the incidence class cutoffs determined in the previous step [103] to categorize each district for each predictor. An example of a potential output from this step is a table such as table 1. The leftmost two columns in that table show the names of a plurality of districts (column 2), and the geographic location of those districts (column 1). The remaining columns show five different predictors, and, for each district, show the incidence class (H—High, M—Medium, L—Low) for that predictor, as well as the district absolute rank for that predictor. As can be seen by the absolute ranks shown in table 1 (e.g., the absolute rank of 174 in the predictor of population risk factors for the Albany, N.Y. district), that table is actually an excerpt of a much larger table that could be prepared according to the techniques described above. In general, the techniques described above are usable with any number of predictors and districts, though it has been found that the set of predictors listed below can be useful in providing meaningful data on pharmaceutical brand performance.

Number of specialists, which should be understood to refer to the number of specialists that contribute to that particular brand's revenue in a fixed amount of time. A "specialist" should be understood to mean a doctor who is devoted to a particular branch of medicine or surgery.

Specialist share, which should be understood to refer to the percentage of scripts (or revenue) that specialists contribute in an area.

Prescriptions per specialist, which should be understood to refer to the number of prescriptions each specialist is writing in a fixed amount of time, in a fixed area.

Doctors per population, which should be understood to refer to the number of doctors in the population of the fixed area.

Specialists per population, which should be understood to mean the number of specialists in the population of the fixed area.

Primary care physicians (PCPs) per population, which should be understood to mean the number of primary care physicians in the population of the fixed area.

Prescriptions per PCP or total doctors, which should be understood to mean the number of prescriptions written by primary care physicians divided up by each primary care physician. This can also be calculated by the number of prescription written by the total doctors for the fixed area.

Number of top decile doctors, which should be understood to mean the number physicians in the fixed area that are making up the top 10% of the total revenue for that particular brand (Decile 10-D 10 category).

Number of top quintile doctors, which should be understood to mean the number of physicians that make up the top 20% (Quintile 5-Q5 Category) of the total revenue for that particular brand in a fixed area.

Share of top decile doctors, which should be understood to mean the percentage of revenue or prescriptions, of the total, that each physician in the D10 category contributes for that particular brand in a fixed area.

Share of top quintile doctors, which should be understood to mean the percentage of revenue or prescriptions of the total that each physician in the Q5 category contributes for that particular brand in a fixed area.

Share of third and fourth quintile doctors, which should be understood to mean the percentage of revenue, from the total revenue, that the top 60% removing the top 20%, contribute for that particular brand in a fixed area.

Share of first and second quintile doctors, which should be understood to mean the percentage of revenue, from the total revenue, that the bottom 40% contributes for that particular brand in a fixed area.

Reach and frequency of top decline doctors, which should be understood to mean the reach and frequency that sales representatives make of sales presentations to the top 10% of revenue generating MDs. For example during the past month we reached 50% of D10 MDs on average 3 times.

Reach and frequency of top quintile doctors, which should be understood to mean the reach and frequency that sales representatives make of sales presentations to the top 20% of revenue generating MDs.

Total reach and frequency, which should be understood to mean the reach and frequency that sales representatives make of sales presentations to MDs.

Reach and frequency of third and fourth quintile doctors, which should be understood to mean the reach and frequency that sales representatives make of sales presentations to the Q3 and Q4 MDs.

Reach and frequency of first and second quintile doctors, which should be understood to mean the reach and frequency that sales representatives make of sales presentations to the bottom 40% of revenue generating MDs.

Total starters, which should be understood to mean the total number of samples given to physicians in a fixed area.

Medicare category size, which should be understood to mean how many total Medicare prescriptions in a fixed area.

Brand share Medicare, which should be understood to mean the percentage of total revenue that Medicare patients contribute for a particular brand in a fixed area.

Competitors in share Medicare, which should be understood to mean the percentage of market share of the total of Medicare patients combined among all competing brands.

Generic share Medicare, which should be understood to mean the percentage of market share of the total of Medicare patients of the generic brand(s) revenue.

Medicaid category size, which should be understood to mean the number of prescriptions in a fixed area that fall into a particular Medicaid category.

Brand share Medicaid, which should be understood to mean the percentage of total revenue that Medicaid patients contribute for a particular brand in a fixed area.

Competitors share Medicaid, which should be understood to mean the percentage of market share of total Medicaid patients divided between all competing brands.

Generic Share Medicaid, which should be understood to mean of the total Medicaid patients, the percentage of market share of the generic brand revenue Brand T2, which should be understood to mean of the total prescriptions written for a brand, what percentage were sold as Tier 2 prescriptions. "Tier 2" should be understood to refer to the lowest co-pay patients pay for prescriptions for branded medicines.

Competitors T2, which should be understood to mean, of the total prescriptions written for each of the competition, what percentage were sold as Tier 2 prescriptions.

Brand share, which should be understood to mean the percentage of market share, of total market share (competitors and generic), a particular brand has in a particular category, in a fixed area.

Competitor's share, which should be understood to mean the percentage of market share, of total market share, each competitor has in a particular category, in a fixed area.

Generic share, which should be understood to mean the percentage of market share, of total market share, the generic brand has in particular category, in a fixed area.

Category size (total new prescriptions), which should be understood to mean the total number of new prescriptions written for a particular drug category including all branded and generic.

Category size (total prescriptions), which should be understood to mean total number of new and refill prescriptions written for a particular drug category including all branded and generic.

Brand share change in the last three months, which should be understood to mean percentage market share the particular brand has over the past 3 months versus the same 3 months year ago, in a fixed area.

Brand share change in the last six months, which should be understood to mean percentage market share the particular brand has over the past 6 months versus the same 6 months year ago, in a fixed area.

Brand share change in the last twelve months, which should be understood to mean percentage market share the particular brand has over the past year versus the previous year, in a fixed area.

Competitor's share change in the last three months, which should be understood to mean percentage market share each competitor has over the past 3 months versus the same 3 months year ago, in a fixed area.

Competitor's share change in the last six months, which should be understood to mean percentage market share each competitor has over the past 6 months versus the same 6 months year ago, in a fixed area.

Competitor's share change in the last twelve months, which should be understood to mean percentage market share each competitor has over the past year versus a year ago, in a fixed area.

Generic share change in the last three months, which should be understood to mean percentage market share the generic has over the past 3 months versus the same 3 months year ago, in a fixed area.

Generic share change in the last sixth months, which should be understood to mean percentage market share the generic has over the past 6 months versus the same 6 months year ago, in a fixed area.

Generic share change in the last twelve months, which should be understood to mean percentage market share the generic has over the past year versus a year ago, in a fixed area.

Brand Adherence in the last twelve months for all prescriptions compared to new prescriptions, which should be understood to mean the number of total (new & refill) prescriptions filled in the last 12 months divided by the number of new prescriptions filled in the last 12 months, in a fixed area.

DDD Category total prescriptions, which should be understood to mean the number of total (new & refill) prescriptions for a particular brand filled by the hospitals in a fixed area.

Brand DDD share, which should be understood to mean the percentage share of prescriptions filled, for a particular brand, out of all the prescriptions filled in the hospital for that drug category.

Competitor's DDD share, which should be understood to mean the percentage share of prescriptions filled, for each competitor, out of all of the prescriptions filled in the hospital for that drug category.

Generic DDD share, which should be understood to mean the percentage share of prescriptions filled, for the generic brands, out of all of the prescriptions filled in the hospital for that drug category.

Number of hospitals, which should be understood to mean the number of hospitals in a fixed area contributing to the revenue of that particular drug.

Percent over 65, which should be understood to mean the percentage of adults over the age of 65 in a fixed area.

Percent African American, which should be understood to mean the percentage of adults that are African American in a fixed area.

Percent Hispanic, which should be understood to mean the percentage of adults that are Hispanic in a fixed area.

Percent poverty, which should be understood to mean the percentage of adults that are below the poverty level in a fixed area.

Percent Obese, which should be understood to mean the percentage of adults that are obese in a fixed area.

Category diagnosis rate, which should be understood to mean the percentage of adults diagnosed with a particular disease in a fixed time frame, in a fixed area.

Category treatment rate, which should be understood to mean the percentage of adults who receive treatment for a particular disease in a fixed time frame, in a fixed area.

Category death rate per one hundred thousand, which should be understood to mean the death rate of adults, in a fixed area, per every 100,000 adults that die of a particular disease.

Brand local radio, which should be understood to mean how much money a particular drug has spent on radio advertising in a fixed area over a fixed amount of time.

Brand local newspaper, which should be understood to mean how much money a particular drug has spent on newspaper advertising in a fixed area, over a fixed amount of time.

Brand local print, which should be understood to mean how much money a particular drug has spent on local print advertising in a fixed area, over a fixed amount of time.

Figure 2:
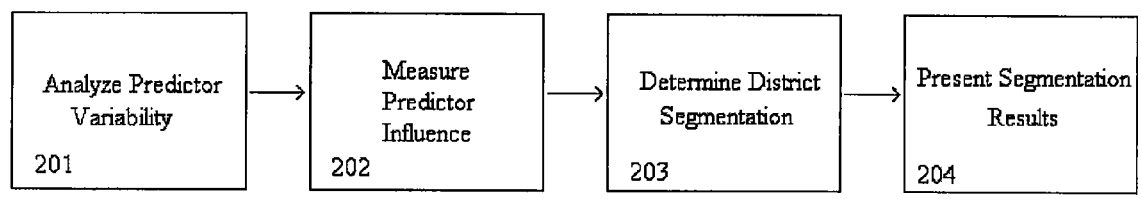
FIG. 2 depicts a sequence which could take place in pharmaceutical market segmentation.

Moving on from the discussion of FIG. 1, another aspect which may be included in pharmaceutical market segmentation analysis is depicted in FIG. 2, which depicts a sequence of steps which might take place in the analysis of predictors. As shown in FIG. 2, some techniques may include an initial step of analyzing predictor variability [201]. For example, in a case where a pharmaceutical product is marketed nationwide, it may be that certain predictors of brand share may have very little variation on a district to district basis, and therefore may be treated differently than other predictors where the variation is greater. This variation determination can be performed using district level predictor data as described above, along with statistical techniques of measuring variance which are well known to those of ordinary skill in the art.

Figure 3:
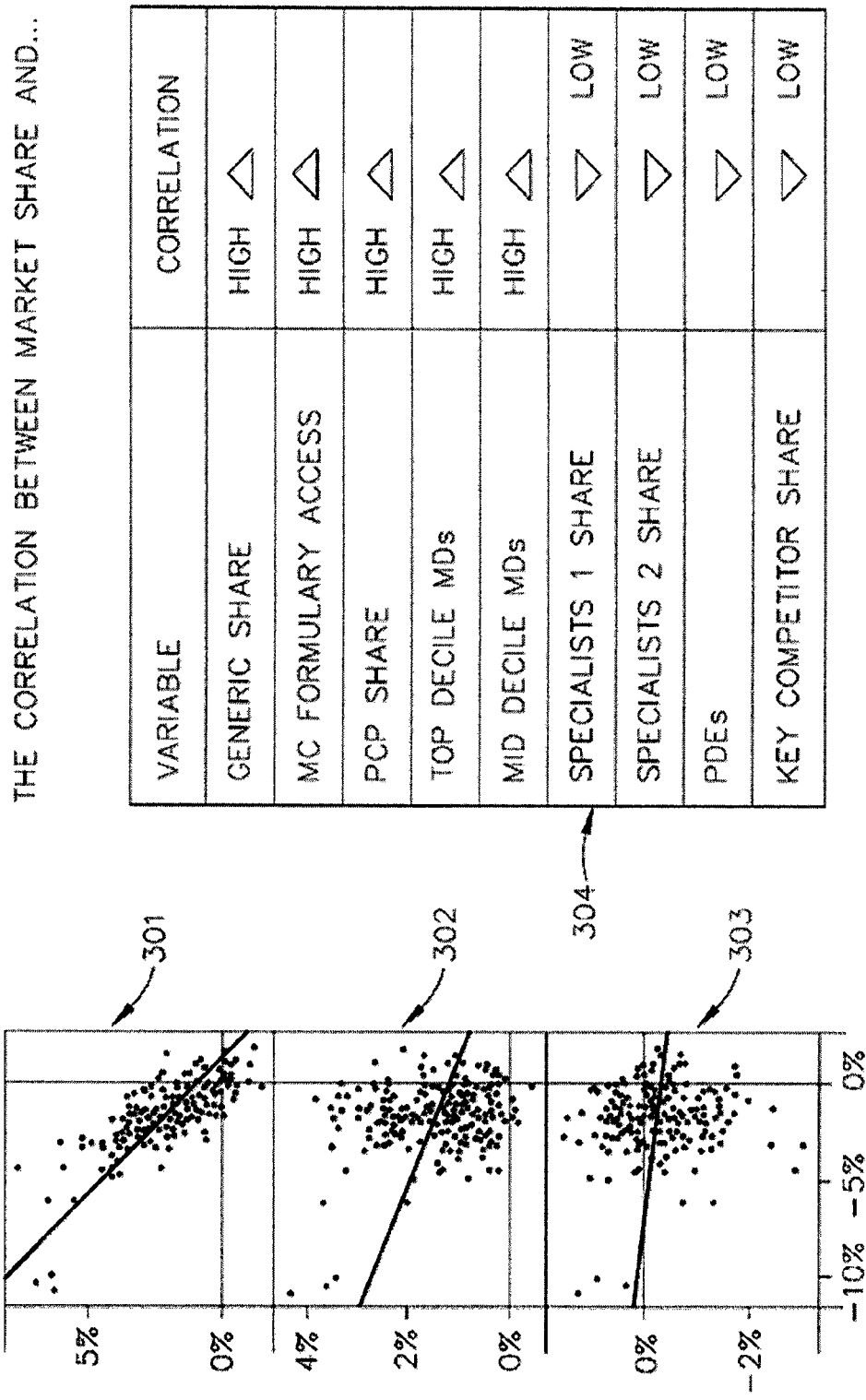
FIG. 3 depicts a presentation format for measures of influence for certain predictors.

The next step shown in FIG. 2 is to measure predictor influence [202]. This step refers to the process of determining a measurement (e.g., a percentage value) for the influence that the predictors have on brand share. A variety of techniques (e.g., regression analysis, Bayesian classifiers, support vector analysis, etc) can be used to obtain this measurement, which can take a variety of forms such as a percentage, a correlation coefficient, a qualitative label, or other forms. As a specific example of how a measurement of influence might be expressed using a qualitative label, consider the diagram of FIG. 3, which depicts relationships between different predictors as expressed using the labels "High" and "Low," which could be determined for correlations using techniques such as described above regarding assigning districts to incidence classes. In FIG. 3, the left side of that figure contains three graphs [301][302][303], each of the graphs depicting a correlation between one of the measured predictors and brand share performance. As shown in FIG. 3, the correlations for different predictors can be determined independently from one another. On the right side of FIG. 3, there is set forth a table [304] listing correlations between different predictors and market share for a brand (e.g., Generic Share, which is indicated as having a high correlation; and Key Competitor Share, which is indicated as having a low correlation) using qualitative labels. Of course, other qualitative labels or techniques for presenting them could also be used, and so the diagram of FIG. 3 should be understood to be illustrative only, and not limiting.

Once the measures of predictor influence have been determined [202], the process as shown in FIG. 2 continues to determine district segmentation [203]. As is known to those of skill in the art, often a pharmaceutical product is, or will be, marketed in hundreds of individual districts. Determining district segmentation [203] refers to the process of identifying segments (i.e., groups of districts) which can be treated together based on attributes of the districts within those segments. There are a variety of manners in which determining district segmentation [203] can take place. For example, in some implementations there might be a computer program which is written to identify segments. Such a program might create a segment for the predictors identified as having the greatest influence, and then populate the segments with the districts which were assigned to the highest incidence classes for predictor represented by the segment. The program could then compare the set of segments thus created against certain defined attributes (e.g., the number of districts in any individual segment must be at least 10% of the overall number of districts, each district must be assigned to at least one segment, the total number of segments should be between 3 and 5, etc) and iteratively modify the set of segments by adding and removing segments associated with individual predictors until a set of segments which satisfies the defined attributes is discovered. As a variation on the above, in some implementations, in addition to modifying the set of segments by adding and removing segments, various segments might be combined to create compound segments which could provide additional information about individual districts. For example, a computer program could be written such that if the set of segments includes two or more segments which have a high degree of overlap, then a new segment could be created by combining (e.g., by a union, or intersection operation, as may be implemented in various circumstances) the segments previously identified as overlapping. Of course, the techniques described above for determining district segmentation [203] are intended to be illustrative only, and not limiting on the claims included in this or any related application.

Finally, an implementation following the sequence set forth in FIG. 2 will present the segmentation results [204]. As an example of one potential facet of the presentation of segmentation results [204], consider the diagram of FIG. 4a. In FIG. 4a, a first column [401] is provided with labels for segments determined using techniques such as described above. Those labels could be determined, for example, by reference to a database containing labels for observed conditions for the most influential predictors which characterize the districts in each segment (e.g., to determine the label for the segment identified as "specialist focus," a lookup could have been performed on a database to find what label corresponds to the observed condition of a high number of specialists). In the second column [402] of FIG. 4a, there is a listing of definitions for each of the segments listed in the table. As can be seen in FIG. 4a, the various definitions might indicate that certain characteristics (e.g., good formulary access) are shared between segments. Such definitions could be determined in a variety of manners, such as using database lookups as described for determining segment labels, concatenating descriptions of observed conditions which characterize the individual districts within a segment, or other techniques. By presenting segment labels and definitions such as shown in FIG. 4a as part of the presentation of segmentation results [204], it is possible to communicate groupings of districts which can be meaningfully treated as units, for example, in the creation of marketing strategies.

As an example of an additional facet which may be included in the presentation of segmentation results [204], consider the table of FIG. 4b. The table presented in FIG. 4b shows additional information which can be presented for each segment, specifically, strategies and tactics which can be used to improve the performance of a pharmaceutical product under study in the various segments. For example, looking to the second column in FIG. 4b, that column depicts various strategies which could be used in the segments identified in the first column [401]. As with the definitions from the second column of FIG. 4a, the strategies in FIG. 4b could be determined using a variety of techniques, including database lookup as described previously for FIG. 4a. Similarly, concrete programs, such as indicated by tactic identifications in the third column of FIG. 4b could also be obtained by reference to a database containing information about particular tactics which have previously proven effective in situations having characteristics similar to those defining the particular segments. As an alternative, in cases where segments are comprised of districts characterized by more than one observed feature (e.g., good formulary coverage and high branded share), concrete programs can be selected by choosing a first tactic which is appropriate for districts having the first observed feature, a second tactic which is appropriate for districts having the second observed feature, and so on until a tactic appropriate to each of the observed features of a segment has been identified. Of course, combinations of the above approaches, as well as other approaches entirely can be used in determining strategies and tactics for use in particular segments. Accordingly, the above description should be understood as being illustrative only, and not limiting.

Figure 4C:
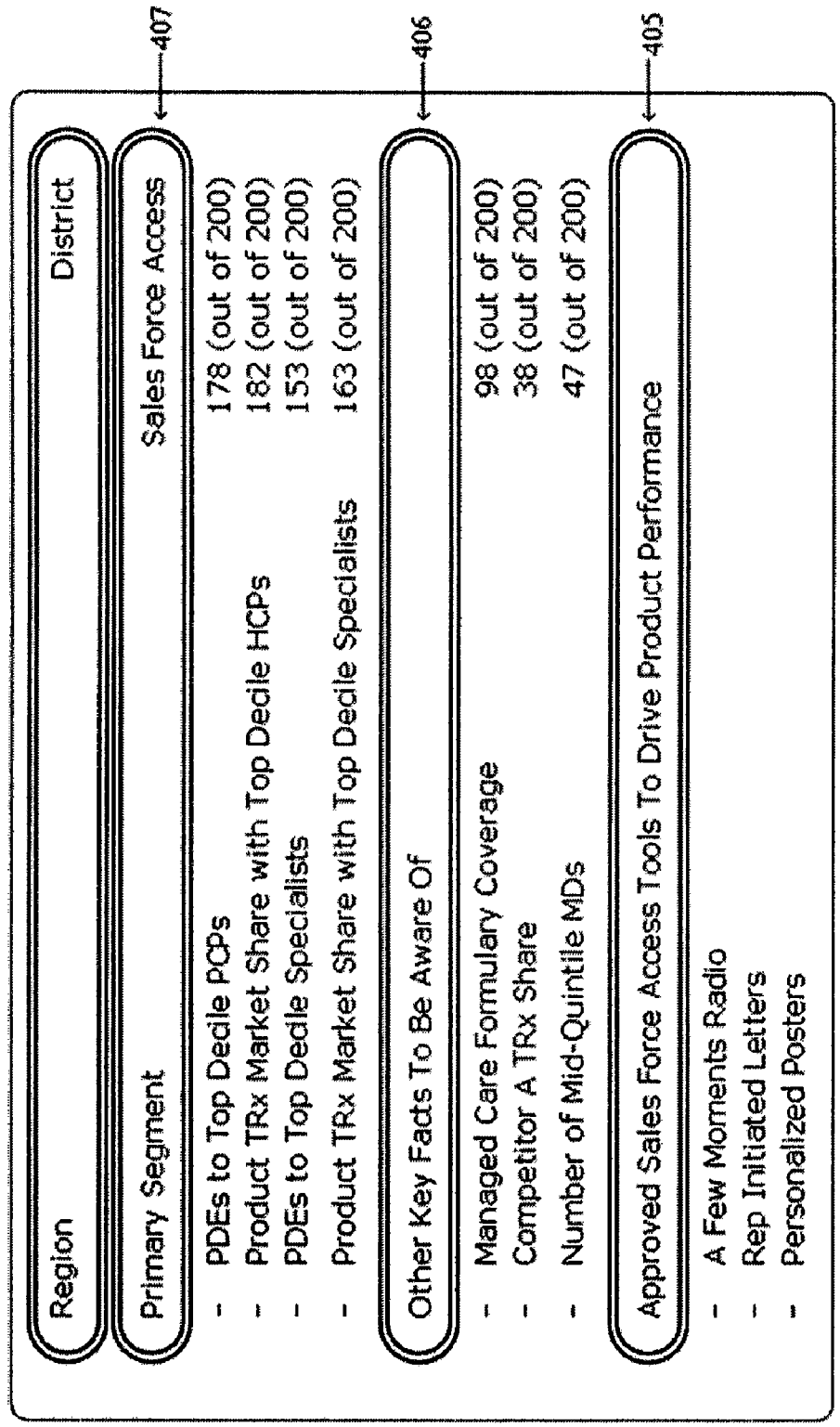

As yet another facet which may be included in the presentation of segmentation results, consider FIG. 4c. FIG. 4c depicts a potential action tool which could be sent to sales managers in particular districts based on the information obtained using segmentation analysis such as described above. For example, FIG. 4c includes an identification [407] of the segment in which a district is placed (e.g., Sales Force Access, in the example shown in FIG. 4c). Associated with that identification is a set of information regarding certain characteristics of the district which are relevant to its segment assignment (e.g., that the district has a rank of 178/200 in terms of visits to top decline primary care providers). Below that information is a section for communicating other facts about the district to the sales manager [406] (e.g., the district has a rank of 98/200 in managed care formulary coverage). Finally, the potential action tool depicted in FIG. 4c includes a section [405] related to specific sales force action tools which are approved to drive performance for the district (e.g., radio advertisements, or representative initiated letters).

Figure 5A:
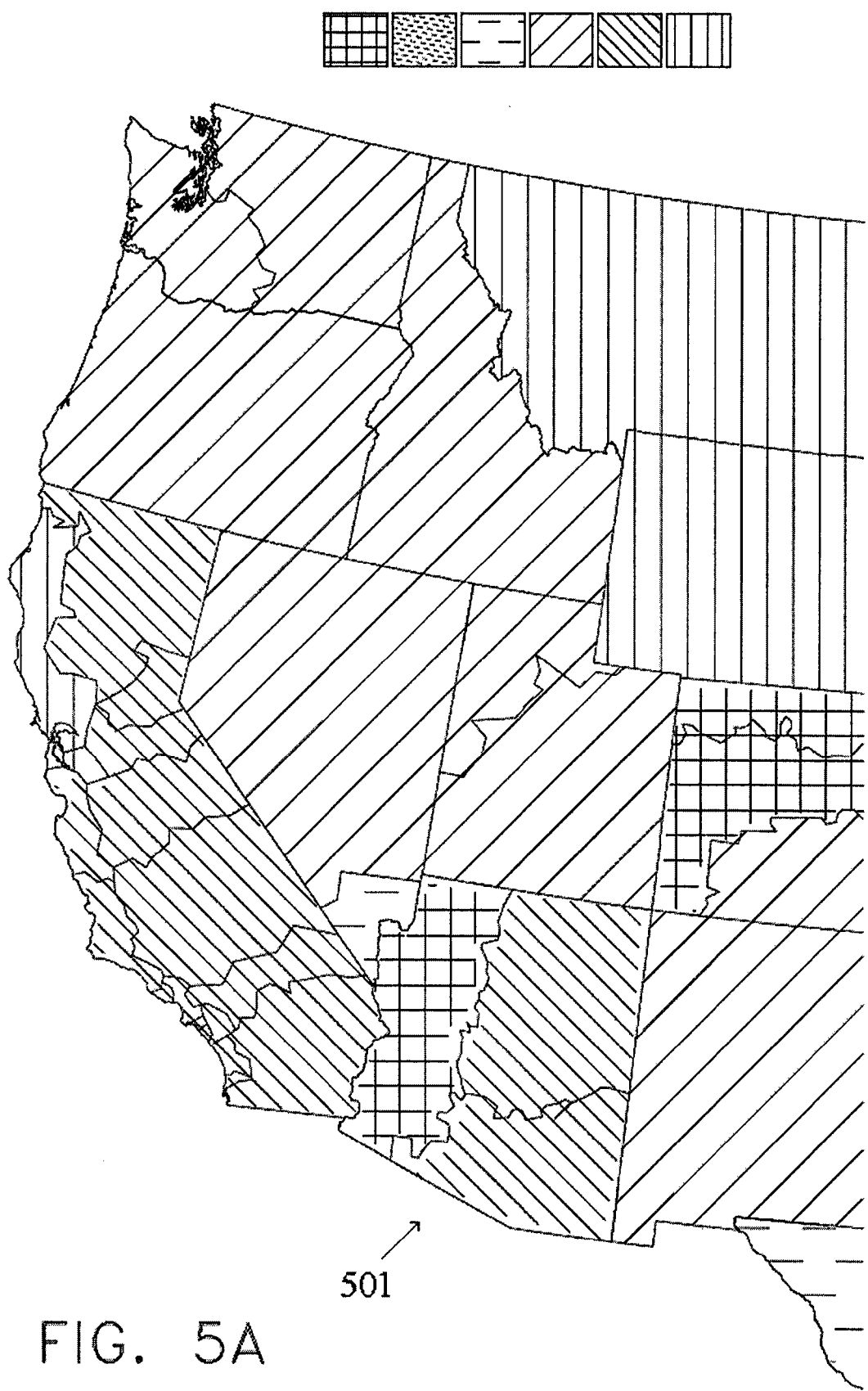
FIGS. 5a-5c depicts a map which could be presented as part of the output for pharmaceutical market segmentation.
Figure 5B:
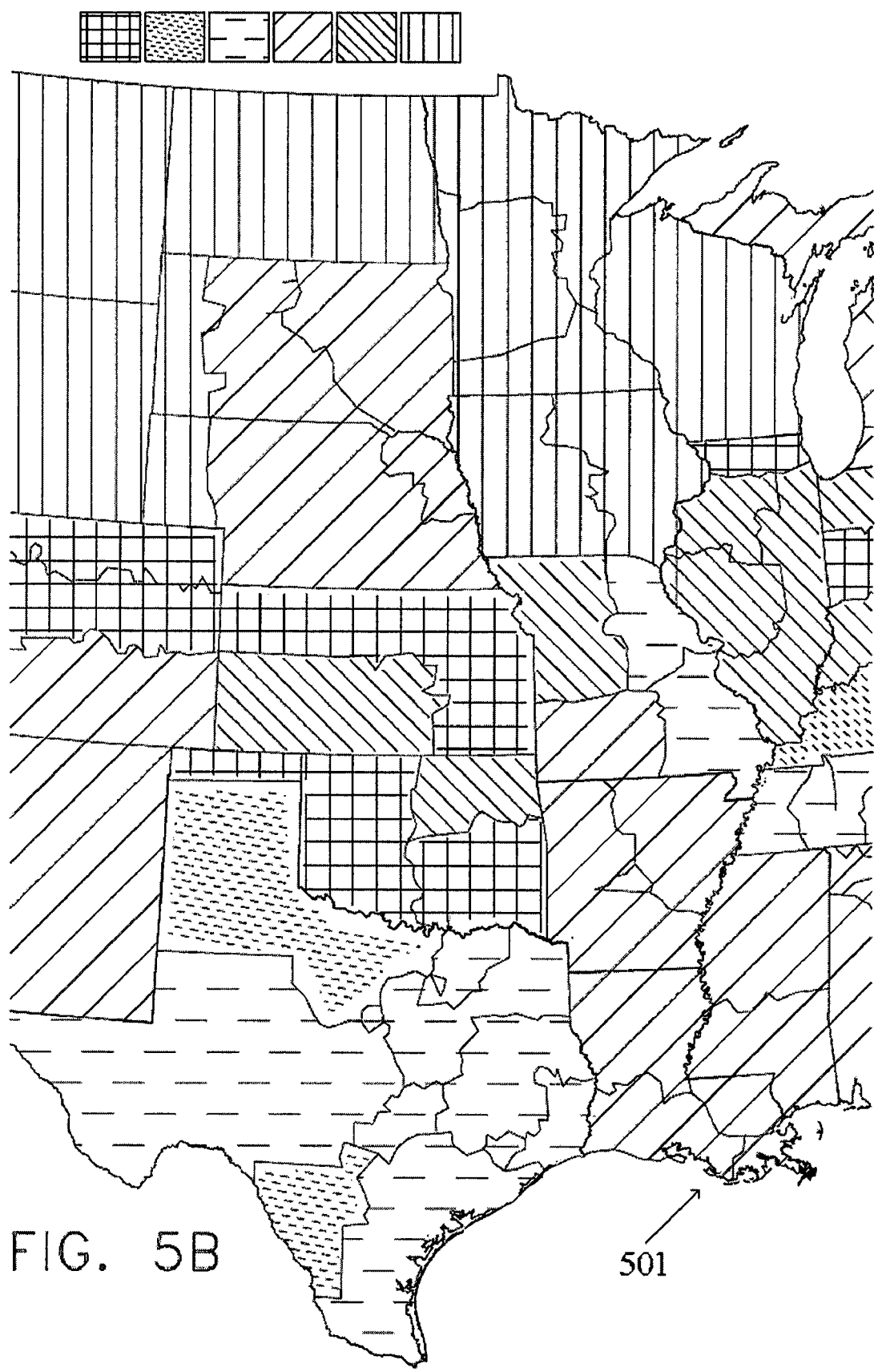
Figure 5C:
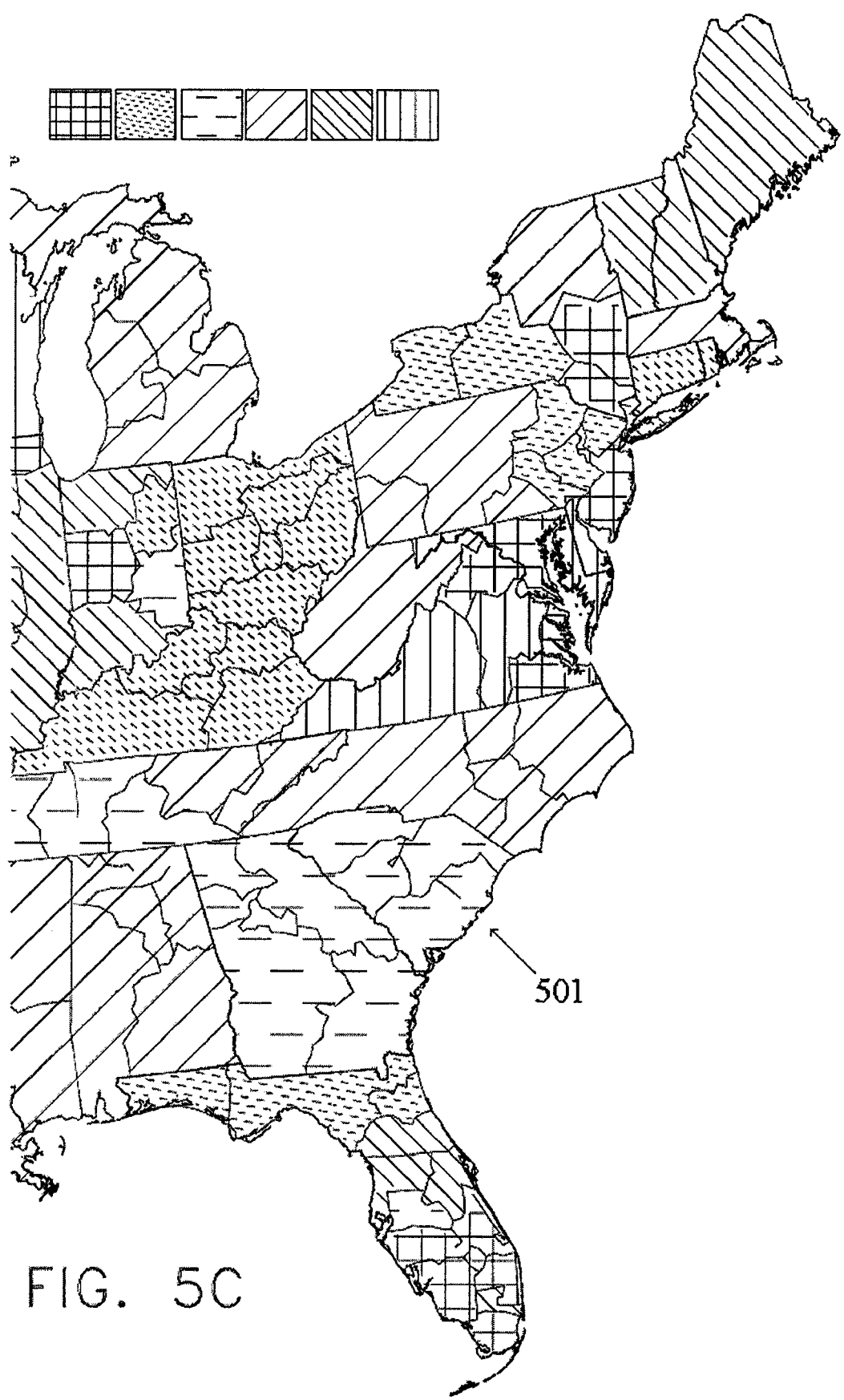

Moving on from FIGS. 4a-4c, FIGS. 5a-5c depicts a map [501] which can be used to provide easy access to information about individual segments, as well as to provide an overall picture of how segments are physically distributed. Using a map [501] such as shown in FIGS. 5a-5c, a user can examine a computer display, and click on a portion of the country to obtain more information about the segment associated with that portion of the country (e.g., displaying an action tool such as shown in FIG. 4c, a segment definition, as shown in FIG. 4a, or strategies for the segment, as shown in FIG. 4b). Alternatively, a map such as shown in FIGS. 5a-5c could be presented as a slide during a presentation, on physical paper associated with specific segment information by an index, or in other formats which may be appropriate to particular circumstances. When considering the map [501] of FIGS. 5a-5c, note that that map has been split into three segments, one displayed in each of FIGS. 5a-5c. In this application, such splitting if used so that certain features of the map [501] can be more clearly perceived. For example, as shown in the map [501] of FIGS. 5a-5c, different segments can be set off using visually perceptible indicators (e.g., linear patterns, such as shown in FIGS. 5a-5c, colors, or some other type of pattern). However, it is not necessary that a map [501] would be broken up when displayed. Accordingly, the above description of presentation of the map from FIGS. 5a-5c should be understood to be illustrative only, and not limiting.

It should be understood that the above description is not intended to be, and should not be treated as, an exhaustive discussion of potential techniques for pharmaceutical market segmentation contemplated by the inventors which could be practiced in light of this disclosure. Many variations, in addition to those described above, are also possible. For example, while the above discussion focused on computer implemented techniques which could be used in pharmaceutical market segmentation, in some instances it is possible that various steps described above could be augmented by, or replaced with, steps performed by human consultants. For instance, in some circumstances, obtaining data might include one or more human consultants discussing commonly used data sources with knowledgeable personnel from a pharmaceutical company, then determining relevant data to be obtained from such discussions, for instance, by asking what additional data sources the pharmaceutical company may already be analyzing. In some cases where both human and automated techniques are used for obtaining data, additional data sources identified by human consultants may be used to augment the complimentary data gathering software (e.g., by writing new database queries, by expanding a library of pharmaceutical information which may be stored in a database, by expanding questionnaires presented by a software system, or through other techniques). Also, obtaining data might include a human consultant reviewing brand strategy and predictors which pharmaceutical company employees believe are currently driving their business. Such a review may help identify additional data to be obtained, and, in some instances, may result in information which can be used in defining segments such that the ultimate output is better aligned with overall strategy, leading marketing strategies based on the segmentation analysis being easier to implement.

Of course, introduction of a human consultant is not the only modification possible on the techniques described above. For example, in some cases, a computer could be used to present a grouping of obtained data, thereby facilitating its eventual communication. As a concrete example of such a grouping, consider that the illustrative list of predictors could be organized into classes according to the table below:

| Name | Predictors | Definition |
| --- | --- | --- |
| Physician | Number of specialists, specialist share, prescriptions per specialist, doctors per population, specialists per population, primary care physicians per population, prescriptions per primary care physician or total doctors, number of top decile doctors, number of top quintile doctors, share of top decile doctors, share of top quintile doctors, share of third and fourth quintile doctors, and share of first and second quintile doctors | A class reflecting information about the individuals who actually write prescriptions. |
| Place | Reach and frequency of top decile doctors, reach and frequency of top quintile doctors, | A class reflecting information |

| Name | Predictors | Definition |
| --- | --- | --- |
| | total reach and frequency, reach and frequency of third and fourth quintile doctors, reach and frequency of first and second quintile doctors, and total starters. | about the sales force and selling environment. |
| Payer | Medicare category size, brand share medicare, competitor's share medicare, generic share medicare, Medicaid category size, brand share Medicaid, competitor's share Medicaid, generic share Medicaid, brand T2, and Competitor's T2, cash and employer initiatives (eg. Pay for Performance) | A class reflecting information about the entity or entities who ultimately pay for a product. |
| Product | Brand share, competitor's share, generic share, category size (total new prescriptions), category size (total prescriptions), brand share change in the last three months, brand share change in the last six months, brand share change in the last twelve months, competitor's share change in the last three months, competitor's share change in the last six months, competitor's share change in the last twelve months, generic share change in the last three months, generic share change in the last six months, generic share change in the last twelve months, and brand Adherence in the last twelve months for all prescriptions compared to new prescriptions. This also includes Brand local radio, brand local newspaper, and brand local print | A class reflecting the performance of the actual product and its key competitors. |
| Provider | DDD category total prescriptions, brand DDD share, competitor's DDD share, generic DDD share, and number of hospitals. | A class which reflects the systems that actually provide healthcare. |
| Population | Percent over 65, percent African American, percent Hispanic, percent poverty, percent obese, category diagnosis rate, category treatment rate, and category death rate per hundred thousand. | A class which reflects the patients in a district and their attributes. |

Such groupings may, in addition to, or as an alternative to, facilitating eventual communication of results, help explain data which is, or needs to be, obtained, or be used as a check to verify that a sufficiently broad variety of data (e.g., at least one metric from each class) has been obtained. Of course, it should be understood that, while the above discussion focused on the use of a computer to group predictors, a presentation of predictor groups could also be made by a human consultant, or using combined human-computer techniques (e.g., powerpoint combined with questions fielded by a consultant). Thus the above description of grouping of predictors should be understood to be illustrative only of a further potential alteration on the techniques described previously, and should not be understood to be limiting on the scope of techniques which could be implemented based on this disclosure or contemplated by the inventors.

Of course, it is also possible that the techniques described herein could be modified by removing aspects of those techniques. For example, while, in some cases, segmentation analysis might include a step of analyzing predictor variability [201], such analysis of predictor variability may not be performed in all implementations of the disclosure set forth herein. For instance, while predictor variability may be analyzed and used to limit calculations to only predictors meeting some minimum threshold of variability (e.g., to minimize computing time), it may also be possible to skip analysis of predictor variability, and simply perform a brute force analysis of all predictors for which data is available. Similarly, while some implementations might include determining absolute ranks for each predictor for the districts under study, in some cases, such rank information might not be determined, and instead analysis and output presentation could be based on the observed prevalence of the various predictors without regard to rank. Accordingly, variations in the techniques described above should be understood to include removal (or replacement) of steps, rather than being limited adding additional steps to the process.

Figure 6:
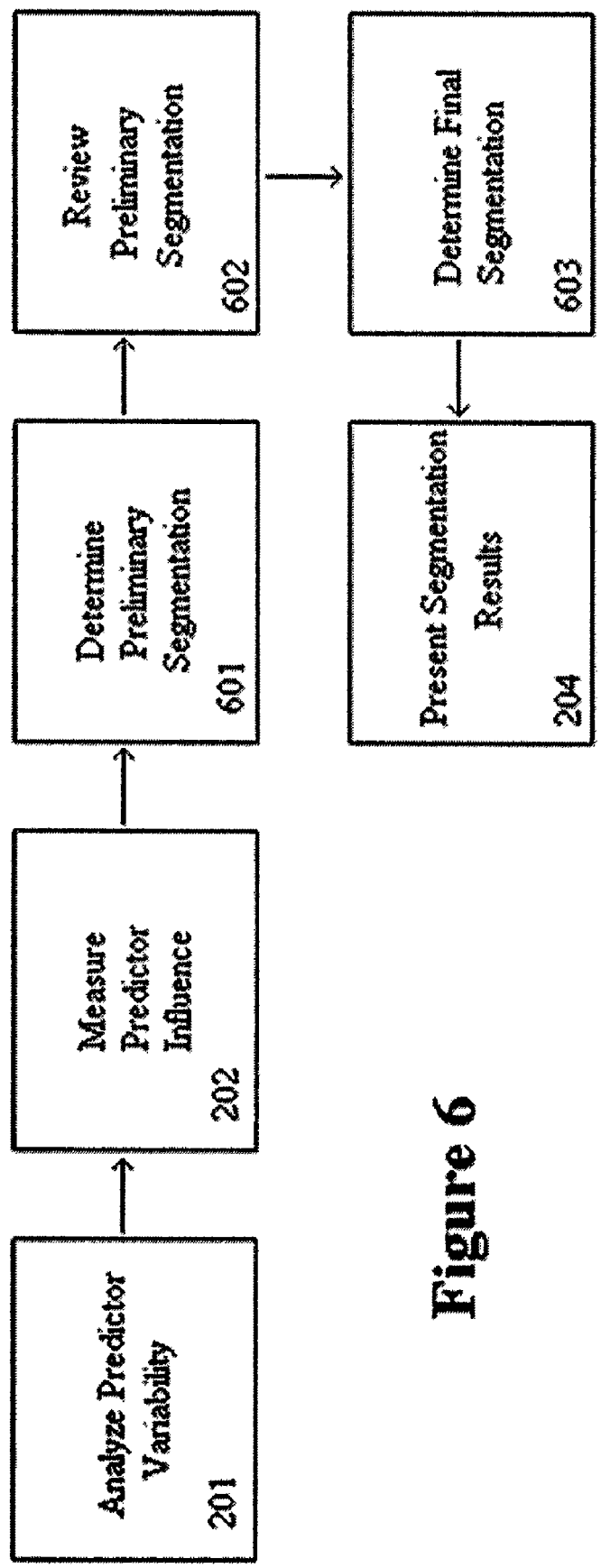
FIG. 6 depicts a sequence which could take place in pharmaceutical market segmentation.

As an example of further potential variation, it is possible that, in some implementations, there may be output beyond that described above. Indeed, in some cases, such output may be presented while the analysis is underway, and reactions to that output could be used to help guide or enhance the analysis. As a concrete example of how such interim output may be utilized, consider a case in which determining district segmentation includes a preliminary segmentation, and a review of the preliminary segmentation with sales managers which is followed by a final segmentation. For the purpose of illustration an exemplary flowchart for such a method is set forth as FIG. 6. In FIG. 6, the flowchart of FIG. 2 is modified such that, after the step of measuring predictor influence [202], there are three distinct steps [601][602][603] laid out before the presentation of segmentation results [204]. In the first of those steps, determining a preliminary segmentation [601] the districts being analyzed might be grouped into a set of candidate segments using techniques such as described previously for determining district segmentation [203]. However, it is also possible that certain aspects of the preliminary segmentation could be different from a final segmentation which is included in the presentation of segmentation results [204]. For example, in an implementation in which one of the requirements for the final set of segments is that there be between three and five segments, the preliminary segmentation might have more relaxed requirements for segment assignment (e.g., providing a set of 2-6 segments, rather than a set of 3-5). Other requirements might also be relaxed for a preliminary segmentation (e.g., if the final segmentation must have each district assigned to one and only one segment, the preliminary segmentation might allow districts to be assigned to multiple segments and/or might include an "unknown" segment for districts which are not assigned).

After determining preliminary segmentation [601], there could be a review of the preliminary segmentation [602]. Such a review might include, for example, providing the preliminary segmentation to sales managers or other employees of a pharmaceutical company, and determining of those individuals believe any of the segments or assignments are inappropriate, or whether there are special circumstances which should be considered for particular districts. For example, in a district where a low number of sales calls on doctors implies inaccessibility of MDs, it is possible that sales managers might know that one or more sales representatives are on maternity leave, and that the low number of sales calls is caused by the maternity leave, rather than by inaccessibility of MDs. With such information, the district might be moved from a first preliminary segment which is characterized by inaccessibility of MDs, to a second segment which is not defined by that feature. Further material in addition to the preliminary segmentation results might also be reviewed at this stage. For example, in a case where sales managers or other employees are reviewing preliminary segmentation results with the aid of a consultant, the consultant might also present information on the measurements of influence which were used in assignment of the preliminary segments (e.g., in a form such as shown in FIG. 3). Of course, other information could be provided during a review of preliminary segmentation [602], or at other points during analysis. Accordingly, the discussion above should be understood to be illustrative only, and not limiting.

After the review of the preliminary segmentation [602], the technique shown in FIG. 6 continues to determine final segmentation [603]. In this step, the information gained previously in the review of the preliminary segmentation [602] can be applied to obtain a set of segments which have whatever characteristics are required for the final segments. This can take place, for example, using a computer program such as described above with respect to FIG. 2, evaluation by human consultants, or both. For instance, a human consultant might review results provided by a computer program to verify that they are acceptable, and may modify or augment those results as necessary. For example, in a case where tactics for segments are determined by retrieval from a database, a consultant might make sure that the results provided by the database are complete (e.g., there are no deficiencies caused by gaps in the data), and appropriate (e.g., the database does not provide a tactic which conflicts with the advertising budget or strategy for a product under study). The database could then be modified or updated based on the results of the consultant's review. Of course, as a general matter, it is also possible that information which could be obtained from a database may, in some implementations, be provided by humans. For instance, a human consultant could prepare definitions and labels for different segments based on his or her experience in the industry and/or the underlying data. Similarly, tactics and strategy for various segments could be determined via consultation with personnel at the pharmaceutical company (e.g., marketing managers who may not have time to develop strategies for ~50-200 districts, but may have time to develop strategies for 3-5 segments). Accordingly, the above description and allocation of duties between consultants and support technology should be understood as being illustrative only, and not limiting.

The foregoing may be considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A non-transitory computer readable medium having stored thereon a set of instructions operable to configure a computer to perform a set steps comprising:
   a) applying an analytic technique to a plurality of measurements for a plurality of districts, said analytic technique providing a measurement of influence on performance for a pharmaceutical product for each of a plurality of predictors, wherein said plurality of predictors comprises at least 40 predictors, wherein the at least 40 predictors comprises:
      number of specialists, wherein number of specialists means the number of specialists that contribute to revenue for the pharmaceutical product during a fixed amount of time, and wherein specialist means a doctor who is devoted to a particular branch of medicine or surgery;
      prescriptions per specialist, wherein prescriptions per specialist means the number of prescriptions each specialist is writing in the fixed amount of time in a fixed area;
      doctors per population, wherein doctors per population means the number of doctors in the population for the fixed area;
      specialists per population, wherein specialists per population means the number of specialists in the population for the fixed area;
      primary care physicians per population, wherein primary care physicians per population means the number of primary care physicians in the population of the fixed area;
      prescriptions per primary care physician, wherein prescriptions per primary care physician means the number of prescriptions written by primary care physicians divided up by the number of primary care physicians in the fixed area;
      prescriptions per total doctors wherein prescriptions per total doctors means the number of prescriptions written by doctors divided by the number of doctors in the fixed area;
      medicare category size, wherein medicare category size means the total number of medicare prescriptions in the fixed area;
      medicaid category size, wherein medicaid category size means the number of prescriptions in the fixed area that fall into a particular Medicaid category;
      category size for total new prescriptions, wherein category size for total new prescriptions means the total number of new prescriptions for a particular drug category including all branded and generic;
      category size for total prescriptions, wherein category size for total prescriptions means the total number of new and refill prescriptions written for the particular drug category including all branded and generic;
      DDD category total prescriptions, wherein DDD category total prescriptions means the total number of new and refill prescriptions for a particular brand filled by hospitals in the fixed area;

number of hospitals, wherein number of hospitals means the number of hospitals in the fixed areas contributing to the revenue of the pharmaceutical product;

percent over 65 wherein percent over 65 means the percentage of adults over the age of 65 in the fixed area;

percent African American, wherein percent African American means the percentage of adults that are African American in the fixed area;

percent Hispanic, wherein percent Hispanic means the percentage of adults that are Hispanic in the fixed area;

percent poverty, wherein percent poverty means the percentage of adults that are below the poverty level in the fixed area;

percent obese, wherein percent obese means the percentage of adults that are obese in the fixed area;

category diagnosis rate, wherein category diagnosis rate means the percentage of adults diagnosed with a particular disease in a fixed time frame, in the fixed area;

category treatment rate, wherein category treatment rate means the percentage of adults who receive treatment for the particular disease in the fixed time frame, in the fixed area; and category death rate per one hundred thousand, wherein category death rate per one hundred thousand means the death rate of adults, in the fixed area, per every one hundred thousand adults that die of the particular disease;

b) for each predictor, assigning each district from said plurality of districts an incidence class; and c) based at least in part on the plurality of incidence classes assigned for each district and the measurements of influence for the plurality of predictors, organizing the plurality of districts into 3-5 segments.

2. The non-transitory computer readable medium of claim 1 wherein said plurality of districts comprises at least two hundred districts.

3. The non-transitory computer readable medium of claim 1 wherein said plurality of predictors comprises a demographic predictor.

4. The non-transitory computer readable medium of claim 1 wherein said plurality of predictors comprises at least one predictor taken from each of the classes of:
  i) payer;
  ii) provider;
  iii) prescriber;
  iv) population;
  v) product; and
  vi) place.

5. The non-transitory computer readable medium of claim 1, wherein:
  a) each predictor is a measurable characteristic of a district;
  b) the set of steps comprises, for each predictor, determining incidence class cutoffs for the predictor, wherein, for each incidence class cutoff, incidence classes above the incidence class cutoff have higher prevalence for the predictor than incidence classes below the incidence class cutoff;
  c) the step of assigning each district from said plurality of districts an incidence class is performed using the incidence class cutoffs; and
  d) the same incidence class cutoffs are used for each district from the plurality of districts.

6. The non-transitory computer readable medium of claim 5, wherein organizing the plurality of districts into 3-5 segments comprises:
  a) creating a plurality of segments corresponding to predictors having the greatest measurements of influence on the performance of the pharmaceutical product; and
  b) populating the segments from the plurality of segments with districts identified as being in incidence classes corresponding to the highest prevalence of the predictors corresponding to the segments being populated.

7. The non-transitory computer readable medium of claim 6, wherein the set of steps further comprises:
  a) for each segment from said 3-5 segments, determining a pharmaceutical marketing strategy based on an existing strategy which had proven effective given observed conditions corresponding to observed conditions in the segment for which the pharmaceutical marketing strategy is being determined; and
  b) for each determined pharmaceutical marketing strategy, determining a plurality of tactics to use in implementing the pharmaceutical marketing strategy, wherein the plurality of tactics are determined using a database containing tactics which have proven effective given conditions corresponding to observed conditions in the segment corresponding to the determined pharmaceutical marketing strategy.

8. The non-transitory computer readable medium of claim 1, wherein the at least 40 predictors further comprises:
  a) specialist share scripts, wherein specialist share scripts means the percentage of prescriptions that specialists contribute in the fixed area;
  b) specialist share revenue, wherein specialist share revenue means the percentage of revenue that specialists contribute in the fixed area;
  c) number of top decile doctors, wherein number of top decile doctors means the number of physicians in the fixed area that make up the top ten percent of the total revenue for the pharmaceutical product in the fixed area;
  d) number of top quintile doctors, wherein number of top quintile doctors means the number of physicians in the fixed area that make up the top twenty percent of the total revenue for the pharmaceutical product in the fixed area;
  e) share of top decile doctors revenue, wherein share of top decile doctors means the percentage of revenue that each physician in the top decile contributes for the pharmaceutical product in the fixed area;
  f) share of top decile doctors scripts, wherein share of top decile doctors scripts means the percentage of prescriptions that each physican in the top decile contributes for the pharmaceutical product in the fixed area;
  g) share of top quintile doctors revenue, wherein share of top quintile doctors revenue means the percentage of revenue that each physician in the top quintile contributes for the pharmaceutical product in the fixed area;
  h) share of top quintile doctors scripts, wherein share of top quintile doctors scripts means the percentage of prescriptions that each physician in the top quintile contributes for the pharmaceutical product in the fixed area;
  i) share of third and fourth quintile doctors, wherein share of third and fourth quintile doctors means the percentage of revenue that the top 60% of physicians, removing the top 20% of physicians contribute for the pharmaceutical product in the fixed area;
  j) competitors m share, wherein competitors m share means percentage of market share of the total of Medicare patients combined among competing brands;

k) generic share Medicare, wherein generic share Medicare means percentage of market share of the total of Medicare patients of revenue for generic products competing with the pharmaceutical product;
l) competitors share Medicaid, wherein competitors share Medicaid means percentage of market share of total Medicaid patients divided by all competing brands;
m) generic share Medicaid, wherein generic share Medicaid means, of total Medicaid patients, the percentage of market share of revenue for generic products competing with the pharmaceutical product;
n) competitors T2, wherein competitors T2 means of total prescriptions written for each competitor, the percentage which were sold as tier 2 prescriptions;
o) competitor's share, wherein competitor's share means the percentage of market share, of total market share, each competitor has in a particular category, in the fixed area;
p) generic share, wherein generic share means percentage share, of total market share, a generic brand has in the particular category in the fixed area;
q) competitor's share change in the last three months, wherein competitor's share change in the last three months means percentage market share shange each competitor has over the past three months versus the same three months a year ago, in the fixed area;
r) competitor's share change in the last six months, wherein competitor's share change in the last six months means percentage market share each competitor has over the past six months versus the same six months a year ago, in the fixed area;
s) competitor's share change in the last twelve months, wherein competitor's share change in the last twelve months means percentage market share each competitor has over the past year versus the previous year, in the fixed area;
t) generic share change in the last three months, wherein generic share change in the last three months means percentage market share a generic competitor for the pharmaceutical product has had over the past three months versus the same three months a year ago, in the fixed area;
u) generic share change in the last six months, wherein generic share change in the last six months means percentage market share the generic competitor for the pharmaceutical product has over the past six months versus the same six months a year ago, in the fixed area;
v) generic share change in the past twelve months, wherein generic share change in the past twelve months means percentage market share the generic competitor for the pharmaceutical product has over the past year versus the previous year, in the fixed area;
w) competitor's DDD share, wherein competitor's DDD share means percentage share of prescriptions filled, for each competitor, out of all the prescriptions filled in a hospital for a drug category including the pharmaceutical product; and
x) generic DDD share, wherein generic DDD share means percentage share of prescriptions filled, for generic competitors of the pharmaceutical product, out of all prescriptions filled in the hospital for the drug category including the pharmaceutical product.

9. A method comprising:
a) using a processor, executing a set of instructions stored on a non-transitory computer readable medium, applying an analytic technique to a plurality of measurements for a plurality of districts, said analytic technique providing a measurement of influence on performance for a pharmaceutical product for each of a plurality of predictors, wherein said plurality of predictors comprises at least 40 predictors, wherein the at least 40 predictors comprises:
number of specialists, wherein number of specialists means the number of specialists that contribute to revenue for the pharmaceutical product during a fixed amount of time, and wherein specialist means a doctor who is devoted to a particular branch of medicine or surgery;
prescriptions per specialist, wherein prescriptions per specialist means the number of prescriptions each specialist is writing in the fixed amount of time in a fixed area;
doctors per population, wherein doctors per population means the number of doctors in the population for the fixed area;
specialists per population, wherein specialists per population means the number of specialists in the population for the fixed area;
primary care physicians per population, wherein primary care physicians per population means the primary care physicians in the population of the fixed area;
prescriptions per primary care physician, wherein prescriptions per primary care physician means the number of prescriptions written by primary care physicians divided up by the number of primary care physicians in the fixed area;
prescriptions per total doctors, wherein prescriptions per total doctors means the number of prescriptions written by doctors divided by the number of doctors in the fixed area;
medicare category size, wherein medicare category size means the total number of medicare prescriptions in the fixed area;
medicaid category size, wherein medicaid category size means the number of prescriptions in the fixed area that fall into a particular Medicaid category;
category size for total new prescriptions, wherein category size for total new prescriptions means the total number of new prescriptions for a particular drug category including all branded and generic;
category size for total prescriptions, wherein category size for total prescriptions means the total number of new and refill prescriptions written for the particular drug category including all branded and generic;
DDD category total prescriptions, wherein DDD category total prescriptions means the total number of new and refill prescriptiosn for a particular brand filled by hospitals in the fixed area;
number of hospitals, wherein number of hospitals means the number of hospitals in the fixed areas contributing to the revenue of the pharmaceutical product;
percent over 65, wherein percent over 65 means the percentage of adults over the age of 65 in the fixed area;
percent African American, wherein percent African American means the percentage of adults that are African American in the fixed area;
percent Hispanic, wherein percent Hispanic means the percentage of adults that are Hispanic in the fixed area;
percent poverty, wherein percent poverty means the percentage of adults that are below the poverty level in the fixed area;

percent obese, wherein percent obese means the percentage of adults that are obese in the fixed area;

category diagnosis rate, wherein category diagnosis rate means the percentage of adults diagnosed with a particular disease in a fixed time frame, in the fixed area;

category treatment rate, wherein category treatment rate means the percentage of adults who receive treatment for the particular disease in the fixed time frame, in the fixed area; and category death rate per one hundred thousand, wherein category death rate per one hundred thousand means the death rate of adults, in the fixed area, per every one hundred thousand adults that die of the particular disease;

b) for each predictor, assigning each district from said plurality of districts an incidence class; and c) based at least in part on the plurality of incidence classes assigned for each district and the measurements of influence for the plurality of predictors, organizing the plurality of districts into a plurality of segments.

10. The method of claim 9, wherein the at least 40 predictors further comprises:
a) specialist share scripts, wherein specialist share scripts means the percentage of prescriptions that specialists contribute in the fixed area;
b) specialist share revenue, wherein specialist share revenue means the percentage of revenue that specialists contribute in the fixed area;
c) number of top decile doctors, wherein number of top decile doctors means the number of physicians in the fixed area that make up the top ten percent of the total revenue for the pharmaceutical product in the fixed area;
d) number of top quintile doctors, wherein number of top quintile doctors means the number of physicians in the fixed area that make up the top twenty percent of the total revenue for the pharmaceutical product in the fixed area;
e) share of top decile doctors revenue, wherein share of top decile doctors means the percentage of revenue that each physician in the top decile contributes for the pharmaceutical product in the fixed area;
f) share of top decile doctors scripts, wherein share of top decile doctors scripts means the percentage of prescriptions that each physican in the top decile contributes for the pharmaceutical product in the fixed area;
g) share of top quintile doctors revenue, wherein share of top quintile doctors revenue means the percentage of revenue that each physician in the top quintile contributes for the pharmaceutical product in the fixed area;
h) share of top quintile doctors scripts, wherein share of top quintile doctors scripts means the percentage of prescriptions that each physician in the top quintile contributes for the pharmaceutical product in the fixed area;
i) share of third and fourth quintile doctors, wherein share of third and fourth quintile doctors means the percentage of revenue that the top 60% of physicians, removing the top 20% of physicians contribute for the pharmaceutical product in the fixed area;
j) competitors m share, wherein competitors m share means percentage of market share of the total of Medicare patients combined among competing brands;
k) generic share Medicare, wherein generic share Medicare means percentage of market share of the total of Medicare patients of revenue for generic products competing with the pharmaceutical product;
l) competitors share Medicaid, wherein competitors share Medicaid means percentage of market share of total Medicaid patients divided by all competing brands;
m) generic share Medicaid, wherein generic share Medicaid means, of total Medicaid patients, the percentage of market share of revenue for generic products competing with the pharmaceutical product;
n) competitors T2, wherein competitors T2 means of total prescriptions written for each competitor, the percentage which were sold as tier 2 prescriptions;
o) competitor's share, wherein competitor's share means the percentage of market share, of total market share, each competitor has in a particular category, in the fixed area;
p) generic share, wherein generic share means percentage share, of total market share, a generic brand has in the particular category in the fixed area;
q) competitor's share change in the last three months, wherein competitor's share change in the last three months means percentage market share shange each competitor has over the past three months versus the same three months a year ago, in the fixed area;
r) competitor's share change in the last six months, wherein competitor's share change in the last six months means percentage market share each competitor has over the past six months versus the same six months a year ago, in the fixed area;
s) competitor's share change in the last twelve months, wherein competitor's share change in the last twelve months means percentage market share each competitor has over the past year versus the previous year, in the fixed area;
t) generic share change in the last three months, wherein generic share change in the last three months means percentage market share a generic competitor for the pharmaceutical product has had over the past three months versus the same three months a year ago, in the fixed area;
u) generic share change in the last six months, wherein generic share change in the last six months means percentage market share the generic competitor for the pharmaceutical product has over the past six months versus the same six months a year ago, in the fixed area;
v) generic share change in the past twelve months, wherein generic share change in the past twelve months means percentage market share the generic competitor for the pharmaceutical product has over the past year versus the previous year, in the fixed area;
w) competitor's DDD share, wherein competitor's DDD share means percentage share of prescriptions filled, for each competitor, out of all the prescriptions filled in a hospital for a drug category including the pharmaceutical product; and
x) generic DDD share, wherein generic DDD share means percentage share of prescriptions filled, for generic competitors of the pharmaceutical product, out of all prescriptions filled in the hospital for the drug category including the pharmaceutical product.

11. The method of claim 9, wherein:
a) each predictor is a measurable characteristic of a district;
b) the method comprises, for each predictor, determining incidence class cutoffs for the predictor, wherein, for each incidence class cutoff, incidence classes above the incidence class cutoff have higher prevalence for the predictor than incidence classes below the incidence class cutoff;
c) assigning each district from said plurality of districts an incidence class is performed using the incidence class cutoffs; and d) the same incidence class cutoffs are used for each district from the plurality of districts.

12. The method of claim 11, wherein organizing the plurality of districts into a plurality of segments comprises:
   a) creating a set of segments corresponding to predictors having the greatest measurements of influence on the performance of the pharmaceutical product; and
   b) populating the segments from the set of segments with districts identified as being in incidence classes corresponding to the highest prevalence of the predictors corresponding to the segments being populated.

13. The method of claim 12, further comprising:
   a) for each segment from said plurality of segments, determining a pharmaceutical marketing strategy based on an existing strategy which had proven effective given observed conditions corresponding to observed conditions in the segment for which the pharmaceutical marketing strategy is being determined; and
   b) for each determined pharmaceutical marketing strategy, determining a plurality of tactics to use in implementing the pharmaceutical marketing strategy, wherein the plurality of tactics are determined using a database containing tactics which have proven effective given conditions corresponding to observed conditions in the segment corresponding to the determined pharmaceutical marketing strategy.

* * * * *

UNITED STATES PATENT AND TRADEMARK OFFICE
CERTIFICATE OF CORRECTION

| | |
|---|---|
| PATENT NO. | : 8,234,154 B2 |
| APPLICATION NO. | : 12/117132 |
| DATED | : July 31, 2012 |
| INVENTOR(S) | : Spanbauer et al. |

It is certified that error appears in the above-identified patent and that said Letters Patent is hereby corrected as shown below:

Column 19, Claim 8, line 24, reads "...market share shange..."; which should be deleted and replaced with "...market share change..."

Column 20, Claim 9, lines 23-24, reads "...population means the primary care..."; which should be deleted and replaced with "...populations means the number of primary care..."

Column 20, Claim 9, line 51, reads "...refill prescriptiosn..."; which should be deleted and replaced with "...refill prescriptions..."

Column 22, Claim 10, line 18, reads "...market share shange..."; which should be deleted and replaced with "...market share change..."

Signed and Sealed this
Eleventh Day of September, 2012

David J. Kappos
*Director of the United States Patent and Trademark Office*